(12) United States Patent
Foley et al.

(10) Patent No.: US 9,783,650 B2
(45) Date of Patent: Oct. 10, 2017

(54) BIODEGRADABLE CROSSLINKED POLYMERS

(71) Applicant: Dow Global Technologies LLC, Midland, MI (US)

(72) Inventors: Paul Foley, Traverse City, MI (US); Xin Jin, Lake Jackson, TX (US); Mark F. Sonnenschein, Midland, MI (US); Nicole L. Wagner, Midland, MI (US); Chaofang Yue, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/124,230

(22) PCT Filed: Mar. 10, 2015

(86) PCT No.: PCT/US2015/019593
§ 371 (c)(1),
(2) Date: Sep. 7, 2016

(87) PCT Pub. No.: WO2015/142564
PCT Pub. Date: Sep. 24, 2015

(65) Prior Publication Data
US 2017/0029590 A1   Feb. 2, 2017

Related U.S. Application Data

(60) Provisional application No. 61/955,330, filed on Mar. 19, 2014.

(51) Int. Cl.
| | | |
|---|---|---|
| *C08G 65/333* | (2006.01) | |
| *C08L 61/20* | (2006.01) | |
| *C08L 71/02* | (2006.01) | |
| *C08J 9/14* | (2006.01) | |
| *C08G 8/38* | (2006.01) | |
| *C08J 3/24* | (2006.01) | |

(52) U.S. Cl.
CPC .............. *C08J 9/146* (2013.01); *C08G 8/38* (2013.01); *C08G 65/333* (2013.01); *C08G 65/33344* (2013.01); *C08J 3/24* (2013.01); *C08J 9/14* (2013.01); *C08L 61/20* (2013.01); *C08L 71/02* (2013.01); *C08G 2650/50* (2013.01); *C08J 2201/026* (2013.01); *C08J 2203/142* (2013.01); *C08J 2205/05* (2013.01); *C08J 2205/10* (2013.01); *C08J 2361/20* (2013.01); *C08J 2361/22* (2013.01); *C08L 2203/14* (2013.01)

(58) Field of Classification Search
CPC .................................................... C08G 65/333
USPC ................................................. 528/245, 230
See application file for complete search history.

(56) References Cited

U.S. PATENT DOCUMENTS

2008/0261884 A1   10/2008   Tsai et al.
2011/0313091 A1   12/2011   Argyropoulos et al.

FOREIGN PATENT DOCUMENTS

| CH | 653351 A5 | 12/1985 |
| CN | 103435832 A | 12/2013 |
| WO | 2015073151 A1 | 5/2015 |

OTHER PUBLICATIONS

Thomson Scientific, XP002740610 (2013).
Howard, "Biodegradation of polyurethane: a review", International Biodeterioration & Biodegradation, vol. 49, pp. 245-252 (2002).

*Primary Examiner* — Duc Truong
(74) *Attorney, Agent, or Firm* — Kenneth Crimaldi

(57) ABSTRACT

A biodegradable crosslinked polymer which is a reaction product of a polymer having aldehyde-reactive functional groups and a polyaldehyde, wherein the polymer having aldehyde-reactive functional groups comprises a biodegradable structure or the polyaldehyde comprises a biodegradable structure.

9 Claims, No Drawings ced to methyl carbamate) or urea. Suitable polyols may include, for example, one or more of an acrylic, saturated polyester, alkyd, polyether or polycarbonate polyol. In one preferred embodiment, the polyol has an average functionality of at least 2.5, preferably at least 3, preferably at least 3.5; preferably no more than 5, preferably no more than 4.5. Preferably, the polycarbamate has a mole ratio of carbamate to hydroxyl groups of at least 1:1, preferably at least 1.2:1, preferably at least 1.4:1. Preferably, a polycarbamate is substantially isocyanate free, i.e., having less than 5 mole percent (mol %) of isocyanate groups based on total moles of carbamate groups plus isocyanate groups in the composition, preferably, less than 3 mol %, preferably, less than 1 mol %, preferably, less than 0.1 mol %. Presence or absence of molecules containing isocyanate groups can be readily determined by Fourier Transform Infrared (FT-IR) spectroscopy or $^{13}$C-NMR spectroscopy. Where an isocyanate group containing reactant is employed, the polycarbamate prepared therefrom is titrated or "quenched" by an isocyanate quenching agent to convert any residual isocyanate groups to carbamates or amines. Examples of compounds that could be used as an isocyanate quenching agent include, e.g., water, sodium hydroxide, methanol, sodium methoxide, and a polyol.

BIODEGRADABLE CROSSLINKED POLYMERS

BACKGROUND

This invention relates to biodegradable crosslinked polymers made from polyaldehydes and polymers having aldehyde-reactive groups.

U.S. Pub. No. 2011/0313091 discloses polymers made from a polyaldehyde, or an acetal or hemiacetal thereof, and a polycarbamate. However, this reference does not disclose a biodegradable polymer made by this method.

STATEMENT OF INVENTION

A biodegradable crosslinked polymer which is a reaction product of a polymer having aldehyde-reactive functional groups and a polyaldehyde, wherein said polymer having aldehyde-reactive functional groups comprises a biodegradable structure or the polyaldehyde comprises a biodegradable structure.

DETAILED DESCRIPTION

All temperatures are in ° C. and all percentages are weight percentages (wt %), unless specified otherwise. All reactions are carried out at room temperature (20-25° C.) unless specified otherwise. The term "(meth)acrylate" means acrylate or methacrylate.

An aldehyde-reactive functional group is one capable of reacting with an aldehyde functional group. The reaction may occur in the presence of a catalyst, preferably at temperatures no greater than 110° C., preferably no greater than 90° C., preferably no greater than 70° C., preferably no greater than 50° C.; preferably the temperature is at least 0° C., preferably at least 10° C. Preferred aldehyde-reactive functional groups include, e.g., carbamates, amines, ureas, amides and alcohols. A polyaldehyde is a compound having at least two aldehyde groups or acetals or hemiacetals thereof. The term "polyaldehyde" is not used herein to mean a polymeric substance made by self-polymerizing an aldehyde monomer. Preferably, the polymer having aldehyde-reactive functional groups and the polyaldehyde are organic materials, i.e., they contain carbon and hydrogen, optionally non-metallic heteroatoms, including, e.g., oxygen, nitrogen and sulfur, and do not contain metallic elements at more than trace levels; preferably organic materials contain only carbon, hydrogen, nitrogen and oxygen.

A biodegradable structure is one meeting the criteria of either the OECD Test Guidelines for biodegradability of organic chemicals or of the ASTM D7475 standard test method for determining aerobic degradation and anaerobic biodegradation of plastics under accelerated bioreactor landfill conditions. Preferably, the biodegradable structure is derived from a biodegradable polyol. Preferred examples of biodegradable polyols include, but are not limited to, polyglycolic acid (PGA) polyol, polylactic acid (PLA) polyol, poly(lactic-co-glycolic acid), poly (glycolide-co-trimethylene carbonate) polyol, polyhydroxybutyrate polyol, poly(ethylene glycol) (PEG) polyol (including copolymers with propylene glycol (PG)), aliphatic polyester polyol with ethylene glycol segments, polyvinyl alcohol and its copolymers, vinyl pyrrolidone copolymer, saccharide-initiated polyether polyols, polycaprolactone diols, pentaerythritol, trimethylolpropane, ethoxylated trimethylolpropane, ditrimethylolpropane, polyether polyols having from two to six carbon atoms between ether oxygen atoms, xylitol, sorbitol, mannitol, and maltitol. Another preferred biodegradable structure is derived from a polyacid, for example, polymethacrylic acid and polyacrylic acid.

Preferably, the polymer having aldehyde-reactive functional groups has an average equivalent weight per aldehyde-reactive functional group from 85 to 3,000, preferably from 100 to 1,800. Preferably, the polymer having aldehyde-reactive functional groups has at least 2.5 aldehyde-reactive functional groups per polymer chain, preferably at least 3, preferably at least 4, preferably at least 5. Preferably, the polymer having aldehyde-reactive functional groups has a weight-average molecular weight, Mw, from 100 to 4000, preferably from 200 to 2000, preferably from 300 to 1500.

Preferably, the molecular weight of the polyaldehyde is from 50 to 400, preferably from 100 to 300, preferably from 120 to 200. Preferably, the polyaldehyde has from two to five aldehyde groups, preferably from two to four, preferably two. Preferably, the polyaldehyde has from four to twenty carbon atoms, preferably from five to fifteen, preferably from five to eleven. Preferably, the polyaldehyde is chosen from a $C_5$ to $C_{11}$ alicyclic or aromatic dialdehyde, preferably, a $C_6$ to $C_{10}$ alicyclic or aromatic dialdehyde, such as, for example, (cis,trans)-1,4-cyclohexanedicarboxyaldehydes, (cis,trans)-1,3-cyclohexanedicarboxyaldehydes and mixtures thereof. Preferably, the polyaldehyde has a solubility in water of at least 0.015 gram of polyaldehyde per milliliter of water at 25° C., preferably at least 0.05, preferably at least 0.1, preferably at least 0.2. Preferred water soluble polyaldehydes include, e.g., glyoxal and glutaraldehyde.

In a preferred embodiment, the polymer having aldehyde-reactive functional groups is a polycarbamate having carbamate functional groups. Preparation of such polymers is described in US2011/0313091. The polycarbamate may be, for example, the condensation product of one or more polyols with an unsubstituted carbamic acid alkyl ester (e.g., methyl carbamate) or urea. Suitable polyols may include, for example, one or more of an acrylic, saturated polyester, alkyd, polyether or polycarbonate polyol. In one preferred embodiment, the polyol has an average functionality of at least 2.5, preferably at least 3, preferably at least 3.5; preferably no more than 5, preferably no more than 4.5. Preferably, the polycarbamate has a mole ratio of carbamate to hydroxyl groups of at least 1:1, preferably at least 1.2:1, preferably at least 1.4:1. Preferably, a polycarbamate is substantially isocyanate free, i.e., having less than 5 mole percent (mol %) of isocyanate groups based on total moles of carbamate groups plus isocyanate groups in the composition, preferably, less than 3 mol %, preferably, less than 1 mol %, preferably, less than 0.1 mol %. Presence or absence of molecules containing isocyanate groups can be readily determined by Fourier Transform Infrared (FT-IR) spectroscopy or $^{13}$C-NMR spectroscopy. Where an isocyanate group containing reactant is employed, the polycarbamate prepared therefrom is titrated or "quenched" by an isocyanate quenching agent to convert any residual isocyanate groups to carbamates or amines. Examples of compounds that could be used as an isocyanate quenching agent include, e.g., water, sodium hydroxide, methanol, sodium methoxide, and a polyol.

In a preferred embodiment, the biodegradable crosslinked polymer is prepared from a mixture of polymers having aldehyde-reactive functional groups. In a preferred embodiment, the biodegradable crosslinked polymer is prepared from a mixture of polyaldehyde compounds. A mixture of polymers having aldehyde-reactive functional groups may include, for example, a polymer comprising a biodegradable structure and a polymer without a biodegradable structure or with a non-biodegradable structure. Preferably, the polymer having aldehyde-reactive functional groups comprises from 10 to 100 wt % biodegradable structures (based on total weight of biodegradable and non-biodegradable structures in the polymer), preferably at least 25 wt %, preferably at least 40 wt %, preferably at least 50 wt %, preferably at least 60 wt %, preferably at least 70 wt % Preferably, at least 10 wt % of the biodegradable crosslinked polymer is biodegradable, preferably at least 20 wt %, preferably at least 30 wt %, preferably at least 40 wt %, preferably at least 50 wt %, preferably at least 60 wt %, preferably at least 70 wt %.

The amounts of the polymer having aldehyde-reactive functional groups and the polyaldehyde preferably are selected to provide a mole ratio of aldehyde functional groups to aldehyde-reactive functional groups from 5% to 95%, preferably from 20% to 80%, preferably from 30% to 70%.

The present invention is further directed to a multicomponent composition comprising the polymer having aldehyde-reactive functional groups and the polyaldehyde. Preferably, to increase the pot-life of the composition, the multicomponent composition further comprises a curing inhibitor. The curing inhibitor is volatilized from the composition under ambient cure conditions. Preferably, the curing inhibitor is chosen from water, an alcohol or a mixture thereof, such as, for example a primary or secondary alcohol.

Preferably, the multicomponent composition is substantially formaldehyde free. Such compositions are substantially free of resins made from formaldehyde, such as aminoplasts and phenol or resole formaldehyde condensates.

Preferably, a catalyst is used to promote the reaction between the polymer having aldehyde-reactive groups and the polyaldehyde. Examples of catalysts include, e.g., Lewis acids (e.g., boron trifluoride etherate) and protic acids (i.e., Brønsted acids). Preferably, the catalyst comprises a protic acid having a pKa of 6 or lower. Thus, the ambient temperature curable composition of the present invention has a pH of 7.0, or less, preferably, from pH 3 to pH<6. A preferred protic acid is an inorganic protic acid or organic protic acid. A preferred inorganic protic acid is phosphoric acid or sulfuric acid. Preferred organic protic acids include carboxylic acids, phosphonic acids and sulfonic acids. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are $AlCl_3$; benzyltriethylammonium chloride (TEBAC); $Cu(O_3SCF_3)_2$; $(CH_3)_2BrS^+Br^-$; $FeCl_3$ (e.g., $FeCl_3.6H_2O$); $HBF_4$; $BF_3.O(CH_2CH_3)_2$; $TiCl_4$; $SnCl_4$; $CrCl_2$; $NiCl_2$; and $Pd(OC(O)CH_3)_2$.

The catalyst can be unsupported (no solid support) or supported, i.e. covalently bonded to a solid support. Examples of supported catalyst are supported acid catalysts such as acid forms of cation exchange-type polymer resins (e.g., ethanesulfonic acid, 2-[1-[difluoro[(1,2,2-trifluoroethenyl)oxy]methyl]-1,2,2,2-tetrafluoroethoxy]-1,1,2,2-tetrafluoro-, polymer with 1,1,2,2-tetrafluoroethene, sold under trade name NAFION NR 50 (E. I. du Pont de Nemours & Co., Inc.) and ethenylbenzenesulfonic acid polymer with diethenylbenzene sold as AMBERLYST 15 (Rohm and Haas Co.).

Preferably, the catalyst is used in an amount of from 0.001 wt % to 10 wt % of the multicomponent composition, based on the total weight of solids in the composition, more preferably from 0.01 wt % to 5 wt %, preferably from 0.1 wt % to 2 wt %, preferably from 0.3 wt % to 1.5 wt %.

Without being bound by theory, Applicants believe that the reaction between the polyaldehyde and the polymer having aldehyde-reactive groups results in the substitution of two aldehyde-reactive groups on the aldehyde group, producing an aminal or acetal (if the aldehyde-reactive group is an alcohol). Some enamine may be formed via elimination from the aminal or from a hemiaminal (product of one carbamate or other nitrogen-containing functional group with a polyaldehyde). Enamines do not contribute to crosslinking of the polymer. The aminal or acetal potentially could be hydrolyzed back to the aldehyde in the presence of water, especially at elevated temperatures (e.g., at least 40° C.). Hydrolysis may be carried out at any pH, although pH in the range from 4 to 9 is preferred. This process could be used to facilitate degradation of the biodegradable crosslinked polymer. After treatment with water for hydrolysis of the polymer (preferably at temperatures at least 40° C., preferably at least 60° C.), the resulting mass could be treated so as to promote further degradation, either by known processes for biodegradation or by known chemical processes for degradation. Preferred crosslinked polymers have at least one aminal group, preferably a geminal bis (urethane) group.

The reaction mixture may contain optional ingredients such as one or more plasticizers, one or more fillers, one or more blowing agents, one or more surfactants, one or more colorants, one or more preservatives, one or more odor masks, one or more flame retardants, one or more biocides, one or more antioxidants, one or more UV stabilizers, one or more acid scavengers, one or more antistatic agents, one or more foam cell nucleators, and the like.

The biodegradable crosslinked polymer of this invention may be used in a variety of materials, e.g., rigid foams, flexible foams, elastomers, coatings, adhesives, sealants, and biomedical applications, including sutures, controlled drug release devices, and tissue engineering.

In a preferred embodiment, the invention is a rigid foam made using a polymeric spray foam system comprising the polymer having aldehyde-reactive functional groups and the polyaldehyde, as well as a blowing agent composition containing a blowing agent that has a boiling temperature in the range −40° C. to +10° C.; and a reaction catalyst. Preferably, the foam system comprises at least two components, wherein the polymer, polyaldehyde and the catalyst are not in the same component.

A step of combining the components preferably is performed using any suitable mixing equipment, including static mixing equipment, impingement mixing equipment, or other suitable mixing equipment.

A step of combining the components preferably is performed and typically is exothermic and proceeds spontaneously at room temperature or slightly elevated temperature (up to 50° C.). Therefore, it is usually not necessary to apply heat to the reaction mixture to effect the cure. However, heating may be applied for a faster cure. Curing temperatures of up to 110° C. can be used. Curing to a tack-free state generally takes place in a matter of a few minutes. In a preferred embodiment, the foam is placed in a reduced-pressure environment to facilitate removal of water from the foam, thereby increasing its stability.

Examples

| POLYCARBAMATE | |
|---|---|
| TARGET GRAMS | 50 |
| carbamate eq wt corrected for MW Change | 0.00536 |
| mole carbamate per target g | 0.26805 |
| CHDA | |
| mole carbamate per target g | 0.2680 |
| equivalent weight | 70.05 |
| CHDA % via GC | 93.77% |
| CHDA g eq./mol | 74.70 |
| GRAMS NEEDED for 1:1 | 20.02 |
| CATALYST | |
| Target wt % of formulation | 1.00% |
| GRAMS NEEDED | 0.8403 |
| 25 wt % solution, actual grams | 3.361 |
| BLOWING AGENT | |
| ~20% of formulation | 14.00 |

| Actual Formulation PART A | | | |
|---|---|---|---|
| Polycarbamate | TEP | Silicone | |
| 90% | 7.20% | 2.70% | wt % |
| 50 | 4 | 1.5 | grams |

| Actual Formulation PART B | | | |
|---|---|---|---|
| CHDA | PHT4 Diol | Silicone | |
| 67% | 30.20% | 2.68% | wt % |
| 20.02 | 9.011 | 0.800 | grams |

Procedure:
1. Mix components A and B individually.
2. Heat A and B in a water bath to 80° C.
3. Add blowing agent to A.
4. Mix at high speed.
5. Add B while mixing
6. Add catalyst via syringe and mix 30 seconds Notes:
1. CHDA is a mixture of 1,3- and 1,4-cyclohexanedicarboxaldehydes.
2. The polycarbamate is a pentaerythritol-initiated chain-extender & crosslinker with Mw avg=600 and OH number avg=378 mg KOH/g (Arch Chemical PolyG 540-378), whereby 60 mol % of the hydroxyl groups on this PolyG polyol were converted to carbamate functional groups (1.5:1 ratio of carbamate:hydroxyl).
3. The blowing agent is HFC245A.
4. The PHT4 Diol is Great Lakes Solutions Flame retardant CAS 77098-07-8
5. TEP is triethylphosphate reagent (used here as a flame retardant agent)
6. The silicone surfactant is Niax L5340 (Momentive Performance Material)

The material began to foam after 15 seconds of mixing and was tack free within a few minutes. The following physical data were obtained from the foam:
Density=132 kg/m$^3$
Compression strength=28 kPa
Open cell %=51

A model system was created using cyclohexene carboxaldehyde and the carbamate used above at a 1:1 mole ratio. Use of the monoaldehyde prevented crosslinking and facilitated analysis of the resulting material. A $^{13}$C NMR spectrum of DMSO solution of this material confirmed that it had an aminal carbon peak at 66.5 ppm and a urethane carbonyl peak at 155 ppm, as well as peaks for enamine at 116 and 121 ppm and hemiaminal at 78-80 ppm. The product appeared to be 80% aminal, 13% enamine and 7% hemiaminal.

The model system product described above was hydrolyzed by placing a sample in a chamber at 70° C. and 100% relative humidity (RH) for one day and then dissolving in DMSO. The aminal linkages were 35% hydrolyzed, the hemiaminal linkages were 51% hydrolyzed and the enamine linkages were 25% hydrolyzed. Further experiments were done and the effects on levels of hemiaminal (H), aminal (A) and enamine (E) are described in the following table:

| Exp. | Conditions | H | A | E |
|---|---|---|---|---|
| 1 | vacuum oven, RT, 2 days | −40% | negligible change | +15% |
| 2 | RT, 2 days | −33% | −20% | +150% |
| 3 | vacuum oven, 70° C., 2 days | −70% | −30% | +60% |
| 4 | vac. oven, 70° C., 2 days; 70° C., 100% RH, 1 day | −20% | −40% | −70% |

RT = room temperature

Hydrolysis Testing Method Description

A rectangular polymer piece of around 0.2 g was cut from each sample. The polymer pieces were then each weighed on a balance and weights were recorded. Each of the pieces was then put into a glass bottle containing 25 ml of 1 M sodium hydroxide aqueous solution (a bulk solution was pre-made by dissolving 40 g of sodium hydroxide solid in deionized water and diluting to 1 L). The bottles were then secured onto a water bath orbital shaker that was preset at 50° C., and then shaken at 125 r.p.m. for 72 hours. At the end of 72 hours, the samples were harvested by slowly decanting the solutions out of the bottles and then removing the samples and rinsing them thoroughly with deionized water. Each piece was then laid onto a plastic weighing boat and then put into an oven that was preset at 50° C. for drying overnight. After drying, the samples were weighed again and the weight numbers were recorded. The weight change was calculated by comparing the weights before and after the incubation process.

| | Weight before incubation (g) | Weight after drying (g) | Calculated weight loss (g) | % weight loss |
|---|---|---|---|---|
| PC Film | | | | |
| #1 | 0.2291 | 0.1846 | 0.0445 | 19.42% |
| #2 | 0.1775 | 0.1432 | 0.0343 | 19.32% |
| #3 | 0.1516 | 0.1369 | 0.0147 | 9.70% |
| #4 | 0.2205 | 0.1681 | 0.0524 | 23.76% |
| #5 | 0.1840 | 0.1396 | 0.0444 | 24.13% |
| #6 | 0.1336 | Mucous-like, could not be retrieved | — | — |
| PCL sample | | | | |
| #1 | 0.1575 | 0.1548 | 0.0027 | 1.71% |
| #2 | 0.1883 | 0.1849 | 0.0034 | 1.81% |

PC = polycarbamate;
PCL = polycaprolactone

Polyols—all converted to carbamates as described in the application

Jeffamine T403—PO-based polyether amine from Huntsman

Voranol 446—EO/PO polyol from Dow

Terathane 650—polytetramethylene ether glycol from Invista; (650 molecular weight)

Terathane 1000—polytetramethylene ether glycol from Invista; (1000 MW)

PCL—Sigma Aldrich with average Mw=~14000 and average Mn=~10000. CAS number 24980-41-4

| PC Film | PC | Carbamate Functionality | OH # | HEW | Sample thickness (mil) | % weight loss |
|---|---|---|---|---|---|---|
| #1 | Jeffamine | 3 | 271 | 207 | 40 | 19 |
| #2 | V446 | 4.6 | 446 | 126 | 40 | 19 |
| #3 | T650 no urea | 2 | 173 | 324 | 25 | 10 |
| #4 | T650 with urea | 2 | 173 | 324 | Deformed sample | 24 |
| #5 | PolyG no urea | 4 | 378 | 150 | Deformed sample | 24 |
| #6 | T1000 | 2 | 113 | 497 | 26 | Mucous-like |

The invention claimed is:

1. A biodegradable crosslinked polymer which is a reaction product of a polymer having aldehyde-reactive functional groups and a polyaldehyde, wherein said polymer having aldehyde-reactive functional groups comprises a biodegradable structure or the polyaldehyde comprises a biodegradable structure; wherein said biodegradable structure is selected from the group consisting of polyglycolic acid polyol, polylactic acid polyol, poly(lactic-co-glycolic acid), poly (glycolide-co-trimethylene carbonate) polyol, polyhydroxybutyrate polyol, aliphatic polyester polyol with ethylene glycol segments, vinyl pyrrolidone copolymer, xylitol, sorbitol, mannitol, maltitol, polymethacrylic acid and polyacrylic acid.

2. The biodegradable crosslinked polymer of claim 1 in which said aldehyde-reactive groups are selected from the group consisting of carbamates, amines, amides, ureas and alcohols.

3. The biodegradable crosslinked polymer of claim 2 in which the polyaldehyde has from five to fifteen carbon atoms and from two to four aldehyde groups.

4. The biodegradable crosslinked polymer of claim 3 in which said polymer having aldehyde-reactive functional groups comprises from 25 to 100 wt % biodegradable structures, based on total weight of biodegradable and non-biodegradable structures in the polymer.

5. The biodegradable crosslinked polymer of claim 4 in which said aldehyde-reactive groups comprise carbamates.

6. The biodegradable crosslinked polymer of claim 5 in which the polyaldehyde is a $C_6$ to $C_{10}$ alicyclic or aromatic dialdehyde.

7. The biodegradable crosslinked polymer of claim 6 in which said polymer having aldehyde-reactive functional groups has an average equivalent weight per aldehyde-reactive functional group from 100 to 1,000.

8. The biodegradable crosslinked polymer of claim 7 in which said polymer having aldehyde-reactive functional groups comprises from 50 to 100 wt % biodegradable structures, based on total weight of biodegradable and non-biodegradable structures in the polymer.

9. The biodegradable crosslinked polymer of claim 1 which is in the form of a rigid foam.

* * * * *